Nov. 5, 1946.  A. TROPIANO  2,410,761
METHOD OF MAKING HEAT-RESISTANT CEMENTITIOUS MATERIAL
Filed July 19, 1944
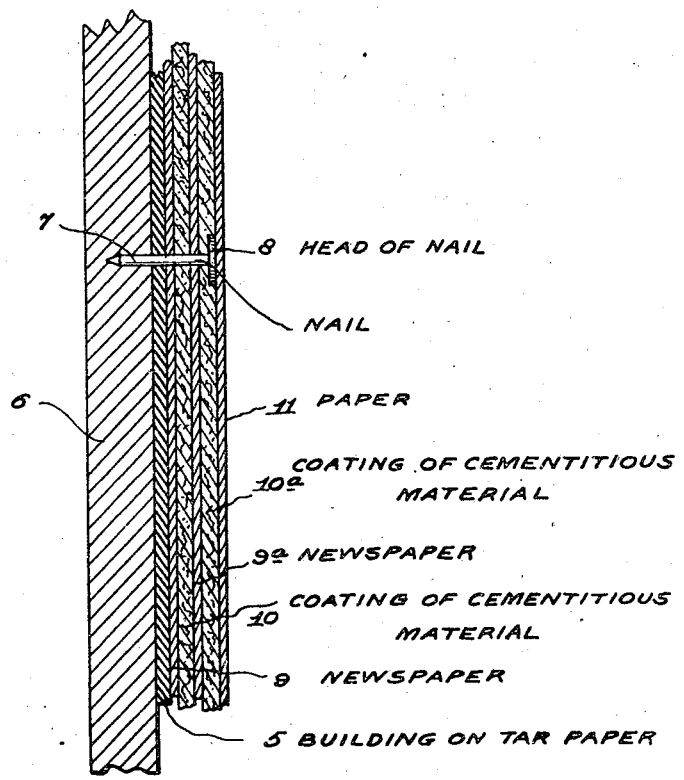
INVENTOR.
ANTHONY TROPIANO
BY
ATTORNEY

UNITED STATES PATENT OFFICE 2,410,761

METHOD OF MAKING HEAT-RESISTANT CEMENTITIOUS MATERIAL

Anthony Tropiano, East Portchester, Conn.

Application July 19, 1944, Serial No. 545,724

1 Claim. (Cl. 25—154)

The invention relates to cementitious materials and has for its object to provide a cementitious material capable of a wide variety of uses, which is heat resistant to a very high degree.

The invention contemplates further the provision of a cementitious material which will resist the action of a blow torch or an acetylene torch applied thereto, and which apparently increases in hardness under the application of such heat.

Another object of the invention is to provide novel coatings of various types embodying the novel cementitious material.

A further purpose of the invention is to provide a novel method of making the novel cementitious material.

Other objects will appear from the description hereinafter and the features of novelty will be pointed out in the claim.

The accompanying drawing which, in exaggerated form, illustrates an example of the invention without defining its limits, shows, in sectional view, a coating embodying the novel cementitious material.

The novel cementitious material may be of various types, all of which include the property of being heat-resistant to a very high degree.

For instance, the novel cementitious material may comprise a mixture of cement and a gypsum plaster or other suitable fibered plaster, and water, mixed together in predetermined proportions. Either of the cements commercially known as "Portland cement" or "Brixment" cement have been found satisfactory and may be used in the mixture.

A satisfactory result has been attained with a mixture consisting of one pound of Portland or Brixment cement, from one up to eleven pounds of gypsum plaster known to the workmen as "neet," and water enough to enable the mixture to be worked into a paste.

The resulting paste may be molded or otherwise shaped to predetermined form and in any case may be baked in the presence of heat preferably at a temperature of at least twenty-three hundred and fifty degrees (2350° F.) Fahrenheit, until hardened. In such case the mixture preferably is first permitted to set and then is made wet, for instance, by holding it in water from a faucet, and then baked for instance by being put in an oven. The material is removed from the oven after a predetermined time-interval, for instance, of fifteen minutes and again made wet and replaced in the oven. This operation is repeated at fifteen-minute intervals until said material has been subjected to the aforesaid treatment for three quarters of an hour. That is, said material is removed from the oven, made wet again, and placed in the oven three times in three-quarters of an hour and then permitted to cool.

At this stage the cementitious material is heat-resistant to a very high degree, and is capable of resisting, without injury, the heat of a blow torch, or an acetylene torch, applied thereto. As a matter of fact, such application of heat appears to increase the hardness of the material.

In some cases paper in relatively small pieces may be added to the aforesaid mixture of Portland or Brixment cement and gypsum plaster (neet) in comparatively small amounts. For instance, the amount of paper added may comprise aproximately several full tablespoons.

The novel material has been also produced in efficient form with a mixture of rockwool, Portland or Brixment cement and gypsum plaster (neet) combined with each other in predetermined proportions, and mixed together in water enough to produce the desired consistency.

For instance, the mixture may comprise one pound of rockwool, one pound of Portland or Brixment cement, one pound of gypsum plaster (neet) and enough water to bring the mixture to the desired consistency.

This mixture may then be permitted to set and heat-treated in the same way as previously described herein.

In its finished form the material is extremely hard and is capable of taking a very high polish.

The novel cementitious material may be used for many purposes such as building blocks, pottery, bath tubs and other tubs, shower stalls, swimming pools and tile. The material further may be used for making molds of different types, pipes, grind stones and ovens, and in addition may be utilized as insulation, as flooring, and for counters, bars and the like.

The novel material may also be used for making wall-boards by being pressed into shape, and in its plastic state will stick to porcelain, china, plaster of Paris, cast iron and other metals, sheet rock, etc., and as plaster on rock, lath, cement blocks, bricks, Celotex and newspaper.

The novel cementitious material may be utilized for many other purposes and is of maximum efficiency as stucco for houses and the like, and in the construction of walls, partitions and the like.

In such case the following proceeding is preferred:

As the first step tar paper or other building paper 5, in the form of sheets, is nailed on the support 6, which may be the frame of a building, a wall or other structure. The nails 7, whereby the sheets 5 are nailed in place, preferably include heads 8 and are driven only part way into the support 6 as illustrated in the drawing, so as to project outwardly beyond the building paper 5. Sheets 9 of newspaper or its equivalent are then secured in place, in surface engagement, with the tar or other building paper 5, in any convenient manner as by means of a suitable paste, shellac or the like. As the next step, a coating 10 of the novel cementitious material in plastic form is applied to the newspaper sheets 9 to cover the same to a predetermined thickness; for instance, said coating 10 may be about ⅛" in thickness. Additional sheets 9—a of newspaper, or the like, are then applied to the coating 10 in surface engagement therewith to cover the same while said coating 10 is still plastic. An additional coating 10—a of the novel cementitious material is then spread upon the surface of the additional sheets 9—a. This second and outer-coating 10—a preferably is also of approximately ⅛" in thickness. The coatings 10 and 10—a are trowelled down under fairly good pressure and the outer-coating 10—a is covered with paper in the form of sheets 11 which remain in place until the material 10 and 10—a has set and dried and then may be removed. The sheets 11 serve to protect the outer-coating 10—a while the latter is drying and subsequent thereto are removed in any convenient manner. The protective sheets 11 may be applied to the coating 10—a by trowelling and in addition to the protective function may serve to produce a surface design on the outer face of the coating 10—a. If necessary, the nails 7 may be driven into proper position at an appropriate stage to imbed the heads 8 thereof in the outer coating 10—a as shown in the drawing.

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the claim.

I claim:

The method of making cementitious material which comprises mixing cement, fibered plaster, and water together in predetermined proportions to form a paste, shaping said paste into predetermined form and permitting it to set, surface-wetting said set material, subjecting said surface-wet material to the action of oven heat of at least twenty-three hundred and fifty degrees Fahrenheit for a time-period of fifteen minutes, removing said material from the action of said heat at the end of said time-period, rewetting said material, subjecting said rewet material to the action of oven heat at the same temperature for a second time-period of fifteen minutes, removing said material from the action of said heat at the end of said second time-period, again wetting said material, subjecting said again-wet material to the action of oven heat at the same temperature for a third time-period of fifteen minutes, removing said material from the action of said heat at the end of said third time-period, and permitting said material to cool.

ANTHONY TROPIANO.